(12) United States Patent
Smedresman et al.

(10) Patent No.: US 11,542,835 B2
(45) Date of Patent: Jan. 3, 2023

(54) ASYMMETRY IN ANNULAR CENTERING SPRING

(71) Applicant: RAYTHEON TECHNOLOGIES CORPORATION, Farmington, CT (US)

(72) Inventors: Adam G. Smedresman, Larchmont, NY (US); Michael Winter, New Haven, CT (US); Ramin M. Rafatpanah, Windsor, CT (US)

(73) Assignee: Raytheon Technologies Corporation, Farmington, CT (US)

( * ) Notice: Subject to any disclaimer, the term of this patent is extended or adjusted under 35 U.S.C. 154(b) by 0 days.

(21) Appl. No.: 17/162,875

(22) Filed: Jan. 29, 2021

(65) Prior Publication Data
US 2022/0243616 A1 Aug. 4, 2022

(51) Int. Cl.
*F01D 25/16* (2006.01)
*F16C 27/04* (2006.01)
*F16F 15/02* (2006.01)

(52) U.S. Cl.
CPC ......... *F01D 25/164* (2013.01); *F01D 25/162* (2013.01); *F16C 27/045* (2013.01); *F16F 15/022* (2013.01); *F05D 2260/96* (2013.01); *F16C 2360/23* (2013.01)

(58) Field of Classification Search
CPC .... F01D 25/164; F01D 25/162; F16C 27/045; F16C 2360/23; F05D 2260/96; F16F 15/022
USPC ........................................................ 415/229
See application file for complete search history.

(56) References Cited

U.S. PATENT DOCUMENTS

| 5,230,787 A * | 7/1993 | Cherian | C25D 1/02 205/67 |
|---|---|---|---|
| 8,083,413 B2 | 12/2011 | Ertas | |
| 8,834,027 B2 | 9/2014 | Zeidan | |
| 9,745,992 B2 | 8/2017 | Barber et al. | |
| 9,841,053 B2 * | 12/2017 | Siebke | F16C 32/0442 |
| 9,879,720 B2 | 1/2018 | Ertas et al. | |
| 9,926,975 B2 | 3/2018 | Smedresman et al. | |
| 10,753,391 B1 | 8/2020 | Smedresman | |
| 2006/0204153 A1 * | 9/2006 | Alam | F01D 25/164 384/99 |

(Continued)

FOREIGN PATENT DOCUMENTS

DE    202007012052    1/2009
DE    102013210215    12/2014

(Continued)

OTHER PUBLICATIONS

European Patent Office; European Search Report dated Jun. 6, 2022 in application No. 22153759.0.

*Primary Examiner* — Yi-Kai Wang
(74) *Attorney, Agent, or Firm* — Snell & Wilmer L.L.P.

(57) ABSTRACT

An assembly for use in a bearing compartment having an axis includes a bearing outer race configured to be located in the bearing compartment. The assembly further includes at least one annular spring positioned in the bearing outer race and being asymmetric in at least one of the axial direction or the circumferential direction relative to the axis to reduce the likelihood of amplification of vibration experienced by the at least one annular spring.

17 Claims, 8 Drawing Sheets

(56) References Cited

U.S. PATENT DOCUMENTS

| | | | |
|---|---|---|---|
| 2009/0304313 A1* | 12/2009 | Ertas | F16C 32/0603 384/99 |
| 2010/0303653 A1* | 12/2010 | Hoelzer | F04D 29/668 417/423.4 |
| 2015/0010387 A1* | 1/2015 | Daimer | F04D 29/4206 267/161 |
| 2017/0276173 A1* | 9/2017 | Smedresman | F01D 25/164 |
| 2021/0047940 A1* | 2/2021 | Ganiger | F01D 25/162 |

FOREIGN PATENT DOCUMENTS

| | | |
|---|---|---|
| EP | 3232072 | 10/2017 |
| WO | 2014166486 | 10/2014 |

\* cited by examiner

ASYMMETRY IN ANNULAR CENTERING SPRING

FIELD

The present disclosure relates generally to gas turbine engines and, more particularly, to centering springs and damper assemblies that are designed to reduce cyclic fatigue.

BACKGROUND

Gas turbine engines include compressor sections to compress an airflow, combustor sections that combine the airflow with fuel for combustion and generate exhaust, and turbine sections that convert the exhaust into torque to drive the compressor sections. Gas turbine engines may include one or more shaft that transfers torque from the turbine section to the compressor section.

Rotating shafts and other rotating turbomachinery in engines are supported by arrays of antifriction bearing assemblies connected to nonrotating structures. During operation, the rotating shafts and other rotating turbomachinery can vibrate about the engine centerline. If not dampened, these vibrations may cause excessive structural loads and result in damage. Dampers are used adjacent to the bearing assemblies to reduce the amplitudes of vibrations in the rotating shaft that are transmitted to the rest of the gas turbine engine. Coulomb and viscous dampers are two of a variety of dampers that can be utilized. One commonly used viscous damper is the squeeze film damper, which utilizes a small, fluid-filled annular gap between the bearing and a nonrotating housing. Radial motion of the rotating shaft causes relative motion between the bearing and the nonrotating housing, which changes the gap to squeeze a damping fluid within the annulus, dampening the motion of the rotating shaft. The nonrotating housing and the bearing assembly may be connected by a centering spring to support the rotating shaft and to move the bearing and shaft towards the centerline when they become off centered. A centering spring design known as the squirrel cage is often used to connect the housing to the bearing assembly and may include a plurality of circumferentially spaced beam springs, acting as the centering springs. Squirrel cages have several notable disadvantages.

SUMMARY

Described herein is an assembly for use in a bearing compartment having an axis. The assembly includes a bearing outer race configured to be located in the bearing compartment. The assembly further includes at least one annular spring positioned in the bearing outer race and being asymmetric in at least one of the axial direction or the circumferential direction relative to the axis to reduce the likelihood of amplification of vibration experienced by the at least one annular spring.

In any of the foregoing embodiments, the first annular spring is configured for use as a centering spring.

In any of the foregoing embodiments, the at least one annular spring is formed to have the asymmetry by adjusting a material in at least a portion of the at least one annular spring.

In any of the foregoing embodiments, the at least one annular spring is formed to have the asymmetry by adjusting a thickness in at least a portion of the at least one annular spring.

In any of the foregoing embodiments, the at least one annular spring is formed to have the asymmetry by adjusting a quantity of turns per unit area in at least a portion of the at least one annular spring.

In any of the foregoing embodiments, the at least one annular spring is formed to have the asymmetry by adjusting a length of at least a portion of the at least one annular spring.

In any of the foregoing embodiments, the at least one annular spring is formed to have the asymmetry by adjusting a shape of at least a portion of the at least one annular spring.

In any of the foregoing embodiments, the at least one annular spring is asymmetric in the axial direction and asymmetric in the circumferential direction.

In any of the foregoing embodiments, the at least one annular spring includes a first annular spring and a second annular spring, and the at least one annular spring is formed to have the asymmetry by adjusting an angular offset of the first annular spring relative to the second annular spring.

In any of the foregoing embodiments, the at least one annular spring includes a first annular spring and a second annular spring, and the at least one annular spring is formed to have the asymmetry by at least one of adjusting a material of the first annular spring relative to the second annular spring, adjusting a thickness of the of the first annular spring relative to the second annular spring, adjusting a quantity of turns per unit area of the first annular spring relative to the second annular spring, adjusting a length of the first annular spring relative to the second annular spring, or adjusting a shape of the first annular spring relative to the second annular spring.

Also disclosed is an assembly for use in a bearing compartment having an axis. The assembly includes a pedestal. The assembly further includes a damper having a damper surface configured to be positioned adjacent to the pedestal and separated from the pedestal by a gap, the gap receiving a damping fluid to form a damping assembly between the damper and the pedestal. The assembly further includes an annular spring positioned axially forward or axially aft of the pedestal and being at least one of radially offset relative to a second annular spring or asymmetric in at least one of the axial direction or the circumferential direction relative to the axis to reduce the likelihood of amplification of vibration experienced by the annular spring.

In any of the foregoing embodiments, the annular spring is formed to have the asymmetry by adjusting a thickness in at least a portion of the annular spring.

In any of the foregoing embodiments, the annular spring is formed to have the asymmetry by adjusting a quantity of turns per unit area in at least a portion of the annular spring.

In any of the foregoing embodiments, the annular spring is formed to have the asymmetry by adjusting a length of at least a portion of the annular spring.

In any of the foregoing embodiments, the annular spring is formed to have the asymmetry by adjusting a shape of at least a portion of the annular spring.

In any of the foregoing embodiments, the annular spring is asymmetric in the axial direction and asymmetric in the circumferential direction.

Also disclosed is an assembly for use in a bearing compartment having an axis. The assembly includes a bearing outer race configured to be located in the bearing compartment. The assembly further includes at least one annular spring positioned in the bearing outer race and being asymmetric in at least one of the axial direction or the circumferential direction relative to the axis to reduce the likelihood of amplification of vibration experienced by the at least one annular spring, wherein the at least one annular spring is formed to have the asymmetry by at least one of: adjusting a material in at least a portion of the at least one annular spring; adjusting a thickness in at least a portion of the at least one annular spring; adjusting a quantity of turns per unit area in at least a portion of the at least one annular spring; adjusting a length of at least a portion of the at least one annular spring; or adjusting a shape of at least a portion of the at least one annular spring.

In any of the foregoing embodiments, the at least one annular spring is asymmetric in the axial direction and asymmetric in the circumferential direction.

In any of the foregoing embodiments, first annular spring is configured for use as a centering spring.

In any of the foregoing embodiments, the at least one annular spring includes a first annular spring and a second annular spring, and the at least one annular spring is formed to have the asymmetry by forming the first annular spring to be asymmetric relative to the second annular spring.

The foregoing features and elements are to be combined in various combinations without exclusivity, unless expressly indicated otherwise. These features and elements as well as the operation thereof will become more apparent in light of the following description and the accompanying drawings. It should be understood, however, the following description and drawings are intended to be exemplary in nature and non-limiting.

BRIEF DESCRIPTION OF THE DRAWINGS

The subject matter of the present disclosure is particularly pointed out and distinctly claimed in the concluding portion of the specification. A more complete understanding of the present disclosure, however, is best obtained by referring to the detailed description and claims when considered in connection with the drawing figures, wherein like numerals denote like elements.

DETAILED DESCRIPTION

The detailed description of exemplary embodiments herein makes reference to the accompanying drawings, which show exemplary embodiments by way of illustration and their best mode. While these exemplary embodiments are described in sufficient detail to enable those skilled in the art to practice the inventions, it should be understood that other embodiments may be realized and that logical, chemical and mechanical changes may be made without departing from the spirit and scope of the inventions. Thus, the detailed description herein is presented for purposes of illustration only and not of limitation. For example, the steps recited in any of the method or process descriptions may be executed in any order and are not necessarily limited to the order presented. Furthermore, any reference to singular includes plural embodiments, and any reference to more than one component or step may include a singular embodiment or step. Also, any reference to attached, fixed, connected or the like may include permanent, removable, temporary, partial, full and/or any other possible attachment option. Additionally, any reference to without contact (or similar phrases) may also include reduced contact or minimal contact. Where used herein, the phrase "at least one of A or B" can include any of "A" only, "B" only, or "A and B."

Figure 1:
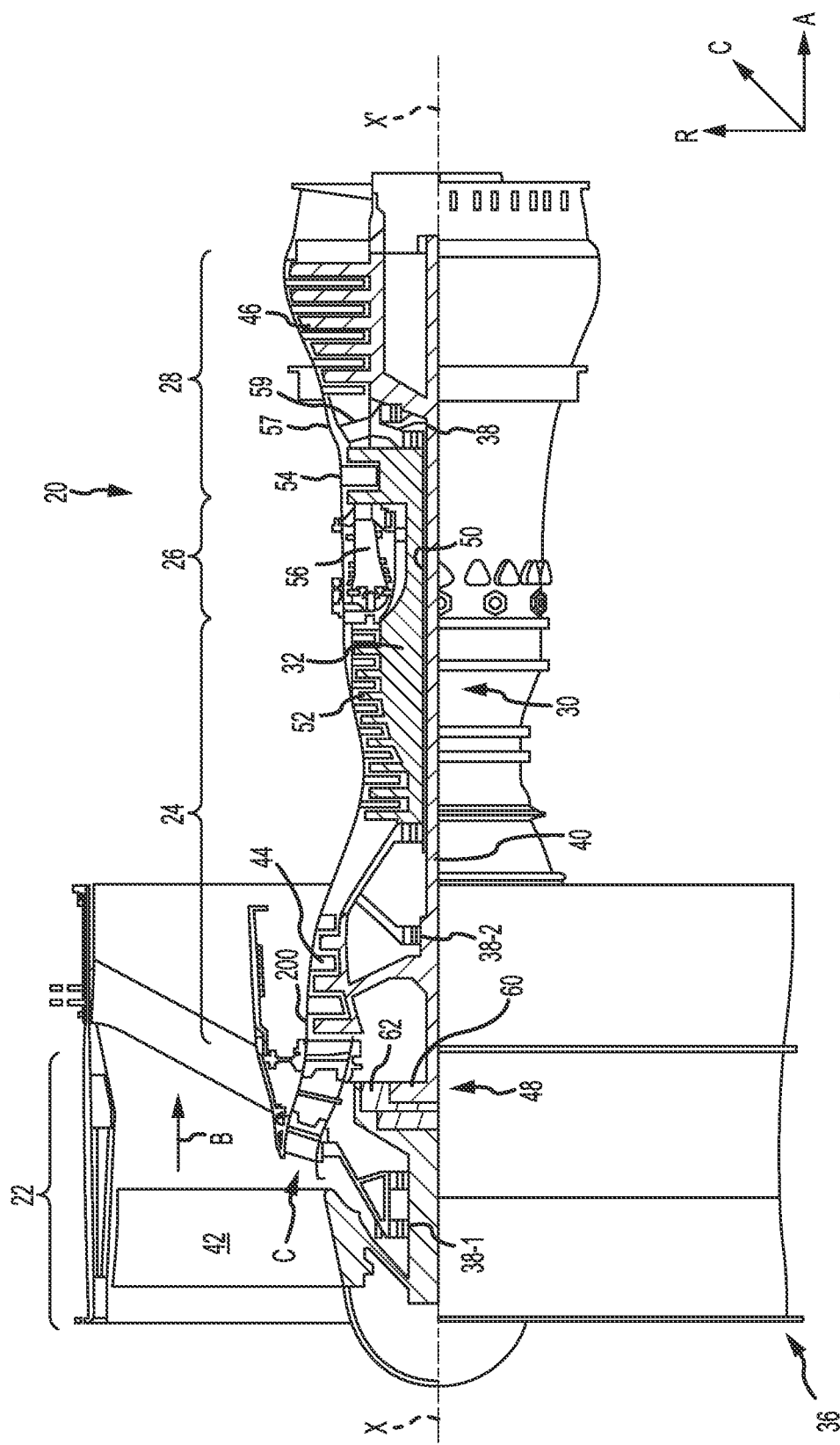
FIG. 1 is a cross-sectional view of an exemplary gas turbine engine, in accordance with various embodiments.

With reference to FIG. 1, a gas turbine engine 20 is provided. As used herein, "aft" refers to the direction associated with the tail (e.g., the back end) of an aircraft, or generally, to the direction of exhaust of the gas turbine engine. As used herein, "forward" refers to the direction associated with the nose (e.g., the front end) of an aircraft, or generally, to the direction of flight or motion. As utilized herein, radially inward refers to the negative R direction and radially outward refers to the R direction. An A-R-C axis is shown throughout the drawings to illustrate the relative position of various components.

The gas turbine engine 20 may be a two-spool turbofan that generally incorporates a fan section 22, a compressor section 24, a combustor section 26 and a turbine section 28. In operation, the fan section 22 drives air along a bypass flow-path B while the compressor section 24 drives air along a core flow-path C for compression and communication into the combustor section 26 then expansion through the turbine section 28. Although depicted as a turbofan gas turbine engine 20 herein, it should be understood that the concepts described herein are not limited to use with turbofans as the teachings may be applied to other types of turbine engines including three-spool architectures, geared turbofan architectures, and turboshaft or industrial gas turbines with one or more spools.

The gas turbine engine 20 generally comprises a low speed spool 30 and a high speed spool 32 mounted for rotation about an engine central longitudinal axis X-X' relative to an engine static structure 36 via several bearing systems 38, 38-1, and 38-2. It should be understood that various bearing systems 38 at various locations may alternatively or additionally be provided, including for example, the bearing system 38, the bearing system 38-1, and the bearing system 38-2.

The low speed spool 30 generally includes an inner shaft 40 that interconnects a fan 42, a low pressure (or first) compressor section 44 and a low pressure (or second) turbine section 46. The inner shaft 40 is connected to the fan 42 through a geared architecture 48 that can drive the fan shaft 98, and thus the fan 42, at a lower speed than the low speed spool 30. The geared architecture 48 includes a gear assembly 60 enclosed within a gear diffuser case 62. The gear assembly 60 couples the inner shaft 40 to a rotating fan structure.

The high speed spool 32 includes an outer shaft 50 that interconnects a high pressure (or second) compressor section 52 and the high pressure (or first) turbine section 54. A combustor 56 is located between the high pressure compressor 52 and the high pressure turbine 54. A mid-turbine frame 57 of the engine static structure 36 is located generally between the high pressure turbine 54 and the low pressure turbine 46. The mid-turbine frame 57 supports one or more bearing systems 38 in the turbine section 28. The inner shaft 40 and the outer shaft 50 are concentric and rotate via the bearing systems 38 about the engine central longitudinal axis X-X', which is collinear with their longitudinal axes. As used herein, a "high pressure" compressor or turbine experiences a higher pressure than a corresponding "low pressure" compressor or turbine.

The core airflow C is compressed by the low pressure compressor section 44 then the high pressure compressor 52, mixed and burned with fuel in the combustor 56, then expanded over the high pressure turbine 54 and the low pressure turbine 46. The mid-turbine frame 57 includes airfoils 59 which are in the core airflow path. The turbines 46, 54 rotationally drive the respective low speed spool 30 and high speed spool 32 in response to the expansion.

The gas turbine engine 20 is a high-bypass ratio geared aircraft engine. The bypass ratio of the gas turbine engine 20 may be greater than about six (6). The bypass ratio of the gas turbine engine 20 may also be greater than ten (10:1). The geared architecture 48 may be an epicyclic gear train, such as a star gear system (sun gear in meshing engagement with a plurality of star gears supported by a carrier and in meshing engagement with a ring gear) or other gear system. The geared architecture 48 may have a gear reduction ratio of greater than about 2.3 and the low pressure turbine 46 may have a pressure ratio that is greater than about five (5). The diameter of the fan 42 may be significantly larger than that of the low pressure compressor section 44, and the low pressure turbine 46 may have a pressure ratio that is greater than about five (5:1). The pressure ratio of the low pressure turbine 46 is measured prior to an inlet of the low pressure turbine 46 as related to the pressure at the outlet of the low pressure turbine 46. It should be understood, however, that the above parameters are exemplary of various embodiments of a suitable geared architecture engine and that the present disclosure contemplates other turbine engines including direct drive turbofans.

The next generation turbofan engines are designed for higher efficiency and use higher pressure ratios and higher temperatures in the high pressure compressor 52 than are conventionally experienced. These higher operating temperatures and pressure ratios create operating environments that cause thermal loads that are higher than the thermal loads conventionally experienced, which may shorten the operational life of current components.

Figure 2A:
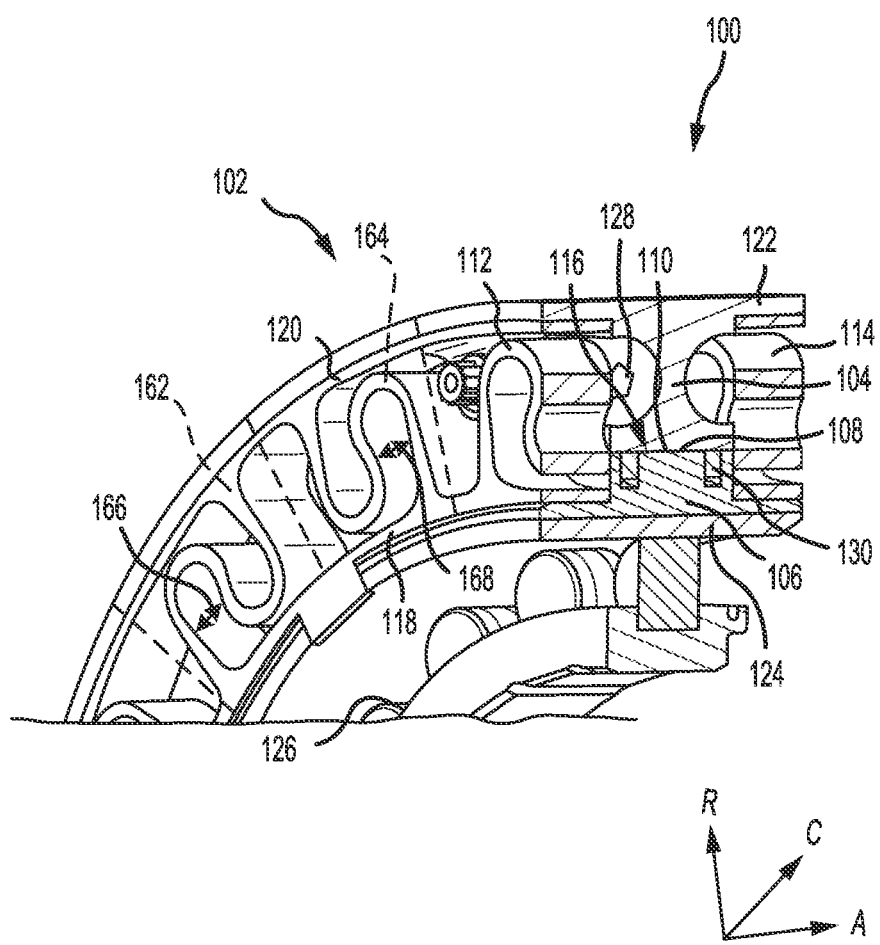
FIGS. 2A, 2B, and 2C illustrate a centering and damping assembly for use in a bearing compartment of a gas turbine engine, in accordance with various embodiments.
Figure 2B:
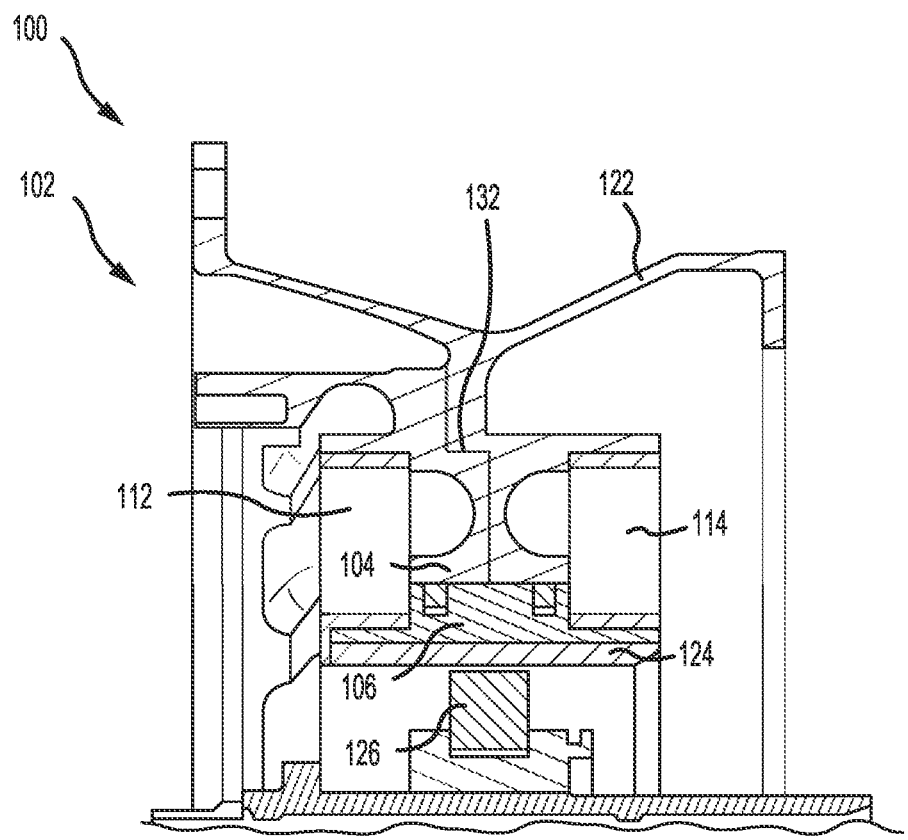
Figure 2C:
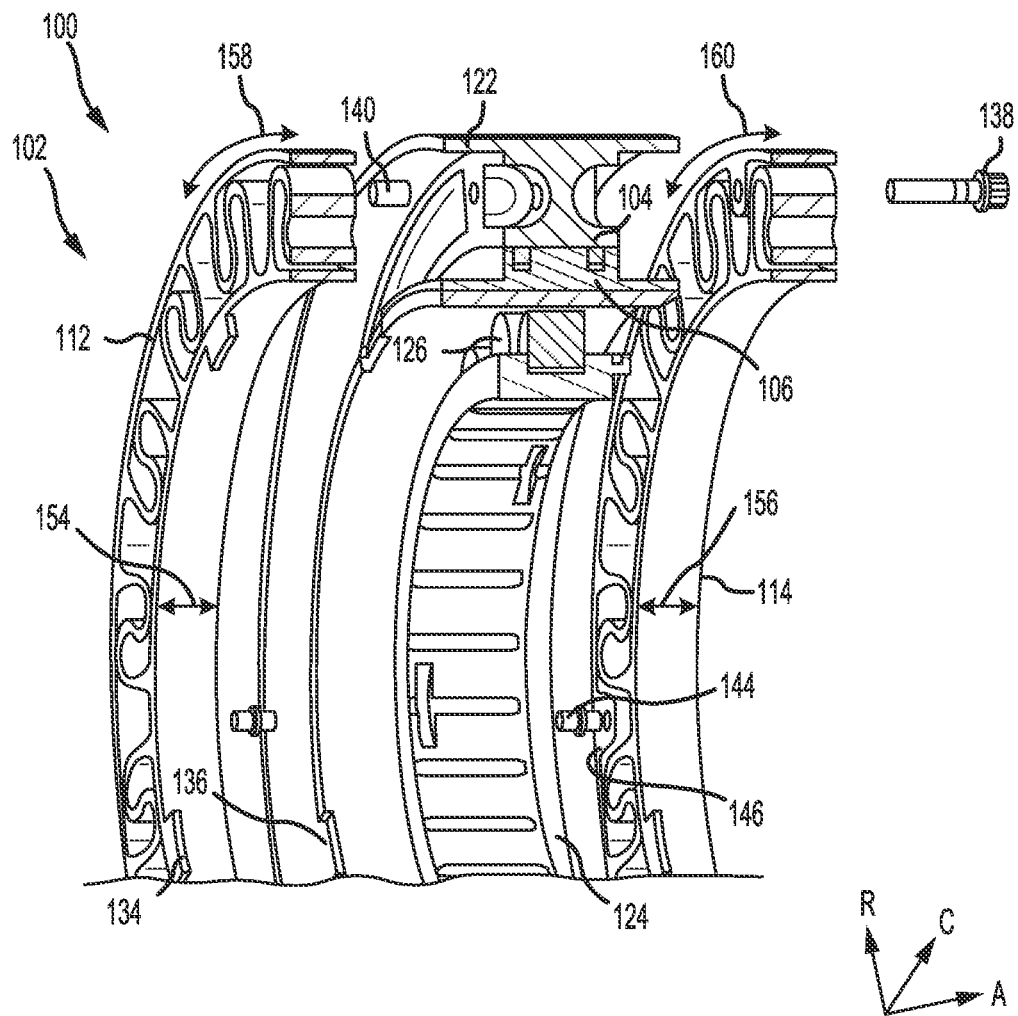

In various embodiments and referring to FIGS. 2A, 2B, and 2C, a centering and damping assembly, or assembly 100, for use in a bearing compartment 102 of a gas turbine engine is shown. The assembly 100 may provide various advantages over conventional centering and damping assemblies. For example, the assembly 100 may be more compact (i.e., utilize less volume) than conventional assemblies, and may include features that reduce an axial dimension of the assembly 100. Additionally, the assembly 100 may provide improved scavenging of damping fluid. The assembly 100 may include various features that axially and circumferentially retain components of the assembly 100, thus reducing the likelihood of damage to any components. An oil nozzle may be included in the assembly 100 to further reduce space utilized in the bearing compartment 102. The assembly 100 may include features that reduce the likelihood of damages during a fan blade out (FBO) event, and may further include features to facilitate disassembly of the assembly 100. For example, the assembly may be used in one or more of the bearing systems 38, 38-1, or 38-2 of FIG. 1.

The assembly 100 may further include features, as discussed further below, that reduce the likelihood of undesirable vibration. For example, particularly if a corresponding engine is vibrating at a harmonic frequency of a spring of the assembly 100, the spring may undesirably amplify such vibrations.

The assembly 100 may include a pedestal 104, a damper 106 having a damper surface 108, a first annular spring 112, and a second annular spring 114. The bearing compartment 102 may include a bearing support 122, a bearing outer race 124, and rollers 126. A shaft may be located radially inward from the rollers 126 and may rotate relative to the assembly 100.

A gap 110 may exist between the damper surface 108 and the pedestal 104 and may receive a damping fluid to form a damping assembly 116. In response to an increase in radial velocity of the shaft, force may be applied radially outward on the assembly 100. The force may be dampened by the damping assembly 116 and the annular springs 112, 114.

The pedestal 104 may define one or more scavenging hole 128 in fluid communication with the damping fluid. In that regard, the scavenging hole 128 may scavenge the damping fluid from the gap 110. The presence of the scavenging hole 128 may allow the annular springs 112, 114 to fully extend towards the bearing support 122, reducing a total size of the assembly 100.

In various embodiments, the bearing support 122 and the pedestal 104 may be formed monolithically. The embodiment illustrated in FIGS. 2A, 2B, and 2C may be utilized in a gas turbine engine in which the assembly 100 may be installed or assembled from the axially forward direction and the axially aft direction. Use of a monolithic component as the bearing support 122 and the pedestal 104 reduces a total part count, thus reducing a manufacturing cost and complexity of assembly.

In various embodiments, the damper 106 and the bearing outer race 124 may be separate and may be formed using different materials. For example, the damper 106 may be or include a titanium, and the bearing outer race 124 may include a steel. It may be desirable for the bearing outer race 124 to include a steel, however, titanium and titanium alloys (e.g., grade 5 titanium, or another relatively light metal) used in the damper 106 may reduce a total mass of the assembly 100 as titanium has a lower density.

It may be desirable to axially and circumferentially retain the various components of the assembly 100. In that regard, various features may function as one or more of an anti-rotation feature or an axial retaining feature. For example, the anti-rotation feature may resist rotation of the annular springs 112, 114 relative to at least one of the pedestal 104 or the damper 106.

In various embodiments, the anti-rotation feature may include a spring castellation 134 defined by the first annular spring 112 (or the second annular spring 114), and a damper castellation 136 defined by the damper 106. The castellations 134, 136 may engage with each other to resist rotation of the first spring 112 relative to the damper 106 or the pedestal 104. In various embodiments, the spring castellation 134 may engage with a pedestal castellation instead of, or in addition to, the damper castellation 136.

In various embodiments, the anti-rotation feature may include a fastener 138 configured to extend through a portion of one or both annular springs 112, 114 and the pedestal 104 (and/or the damper 106). In various embodiments, the fastener 138 may provide axial retention of the components and may also be referred to as an axial retention feature. In various embodiments, the fastener 138 may include a rivet, a bolt, or the like. In various embodiments, a helicoil 140 may be received by an annular spring (such as the first annular spring 112) such that the fastener 138 extends through the second annular spring 114 and the pedestal 104 and is received by the helicoil 140 in order to fasten the annular springs 112, 114 to the pedestal 104.

In various embodiments, the anti-rotation feature may include one or more pins 144 configured to retain one or more of the annular springs 112, 114 to one or both of the pedestal 104 or the damper 106. For example, the second annular spring 114 may define a boss 146 with a hole that receives the pin 144, and the pedestal 104 may include a matching boss with a hole that likewise receives the pin 144. In that regard, the pin 144 may resist rotation of the second annular spring 114 relative to the pedestal 104.

In various embodiments, the annular springs 112, 114 may each include an inner ring 118, an outer ring 120 located radially outward from the inner ring 118, and a compressible portion 119 located radially between the inner ring 118 and the outer ring 120 and configured to be compressed. As will be discussed below, it may be desirable to resist rotation of the inner ring 118 relative to the outer ring 120 in order to reduce the likelihood of damage to the annular springs 112, 114.

The annular springs 112, 114 may be designed to be asymmetric in order to reduce undesirable vibration of the springs 112, 114. In various embodiments, the asymmetry may be introduced in the compressible portion 119 of the annular springs 112, 114, in the inner ring 118, in the outer ring 120, or in at least one of the compressible portion 119, the inner ring 118, or the outer ring 120. Such asymmetry may be introduced in any of a number of manners. The asymmetry may be introduced by making the first annular spring 112 (e.g., the compressible portion of the first annular spring 112) have different features from the second annular spring 114 (e.g., the compressible portion 119 of the second annular spring). For example, the first annular spring 112 may be formed at least partially using a different material from the second annular spring 114 to make the mass of the first annular spring 112 different than the mass of the second annular spring 114.

As yet another example, the first annual spring 112 may have a thickness 154 that is at least partially different from a thickness 156 of the second annular spring 114. For example, the thickness 156 may correspond to each of the compressible portion 119, the inner ring 118, and the outer ring 120

As another example, the first annular spring 112 may have a different quantity of turns per unit area 158 than the second annular spring 114. For example, the compressible portion of the first annular spring 112 may have three turns in the area 158 and the compressible portion 119 of the second annular spring 114 may have four turns in the area 170.

As another example, the first annular spring 112 may have a circumferential length that is different than a circumferential length of the second annular spring 114.

As yet another example, the first annular spring 112 may have a different shape relative to the second annular spring 114. For example, the compressible portion of the first annular spring 112 may have angular turns whereas the compressible portion 119 of the second annular spring 114 may have more rounded turns.

As yet another example, the first annular spring 112 may be radially offset (e.g., radially inward or radially outward) relative to a centerline 130 of the second annular spring 114. In various embodiments, both of the first annular spring 112 and the second annular spring 114 may be offset relative to the centerline 130.

As yet another example, the first annular spring 112 may be angularly offset relative to the second annular spring 114 to introduce the asymmetry of the first annular spring 112 relative to the second annular spring 114.

In various embodiments, the asymmetry may be introduced in only one of the first annular spring 112 or the second annular spring 114, or each of the first annular spring 112 and the second annular spring 114 may have asymmetry introduced in different manners. For example, a first portion 172 of the first annular spring 112 may be formed from a different material than a second portion 174 of the first annular spring 112. The different materials may have different densities in order to introduce the asymmetry.

As another example, the first portion 172 of the first annular spring 112 may be formed to have a thickness 176 that is different than a thickness 178 of the second portion 174 of the first annular spring 112. Such difference in thickness may introduce asymmetry in the first annular spring 112.

As yet another example, the first portion 172 of the first annular spring 112 may have a different quantity of turns than the second portion 174 of the first annular spring 112. Such difference in quantity of turns per unit area may introduce asymmetry within the first annular spring 112.

As yet another example, the first portion 172 of the first annular spring 112 may be formed to have a different length than the second portion 174 of the first annular spring 112. This different length may introduce asymmetry within the first annular spring 112.

As yet another example, a shape of the first portion 172 of the first annular spring may be different than a shape of the second portion 174 of the first annular spring. For example, the turns within the first portion 172 may have a more angular shape relative to the turns of the second portion 174. Such difference in shape may introduce asymmetry within the first annular spring 112.

In various embodiments, one or both of the first annular spring 112 and the second annular spring 114 may be asymmetrical and both the axial direction and in the circumferential direction. For example, the first annular spring 112 may be formed asymmetrically relative to the second annular spring 114 (causing axial asymmetry), and the first annular spring 112 may have a greater quantity of turns in the first portion 172 than in the second portion 174 (causing circumferential asymmetry).

Figure 3:
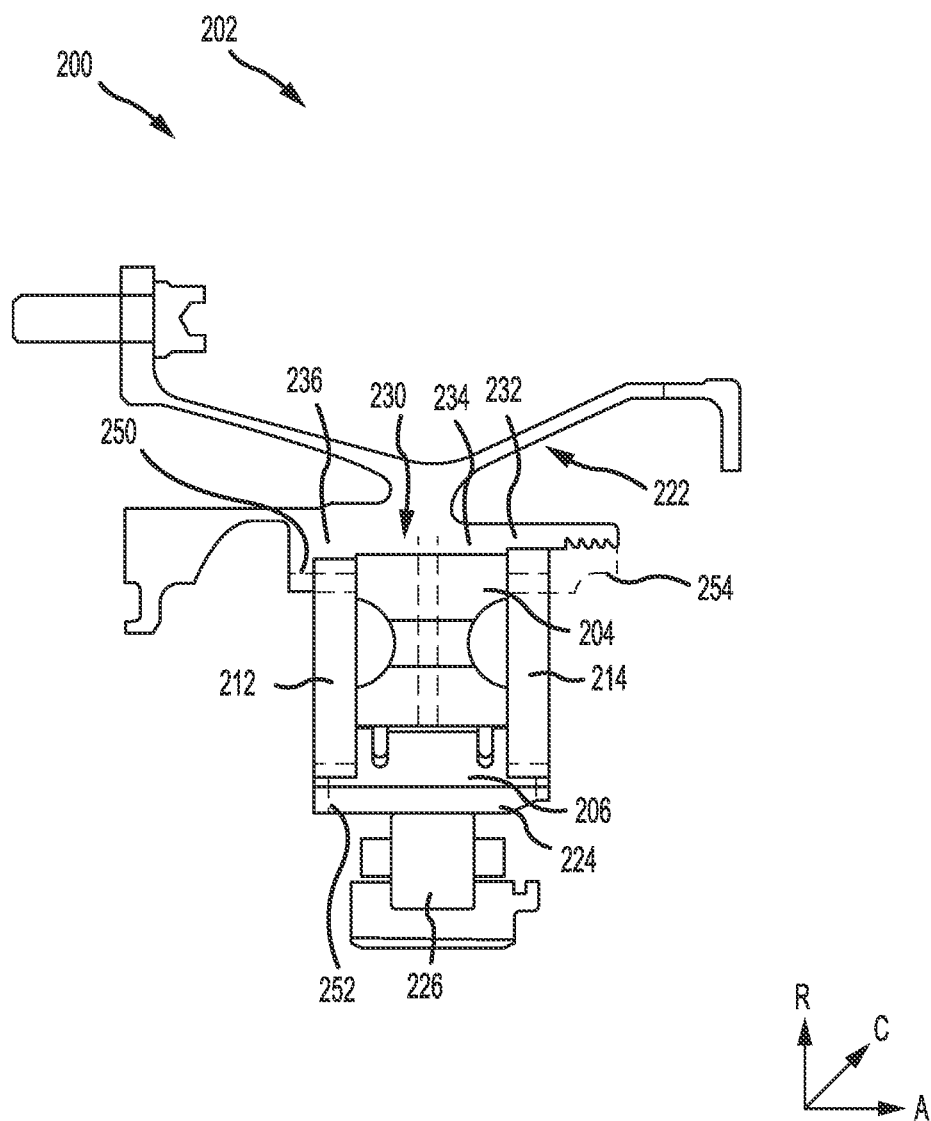
FIG. 3 illustrates a centering and damping assembly for use in a bearing compartment of a gas turbine engine, in accordance with various embodiments.

Referring now to FIG. 3, another assembly 200 may be used in a bearing compartment 202 and may provide centering and damping for a bearing assembly. The components of the assembly 200 may be similar to the components of the assembly 100 of FIG. 2A. In particular, the assembly 200 may include a pedestal 204, a damper 206, a first annular spring 212, a second annular spring 214, a bearing support 222 separate from the pedestal 204, a bearing outer race 224, and rollers 226.

The assembly 200 may differ from the assembly 100 of FIG. 2A in that the assembly 100 is designed to be assembled from a single direction (i.e., from an axially forward direction or from an axially aft direction). In that regard, a coupling feature 250 may be coupled to one or both of the annular springs 212, 214 and one or both of the pedestal 204 or the damper 206, and may resist rotation of the annular springs 212, 214 relative to the pedestal 204 or the damper 206. The coupling feature 250 may further resist axial separation of the annular springs 212, 214 from the pedestal 204 or the damper 206, such as by an interface between a bolt and nut. The coupling feature 250 may include one or more of a pin or castellations (similar to the castellations 134 shown in FIG. 2A). The coupling feature 250 may be located radially outward from the damper 206.

For example, the coupling feature 250 may include a first feature to couple the bearing support 222 to the first annular spring 212, a second feature to couple the first annular spring 212 to the damper 206, and a third feature to couple the damper 206 to the second annular spring 214.

A second coupling feature 252 may be coupled to one or both of the annular springs 212, 214 and one or both of the pedestal 204 or the damper 206, and may resist rotation of the annular springs 212, 214 relative to the pedestal 204 or the damper 206. The coupling feature 252 may further resist axial separation of the annular springs 212, 214 from the pedestal 204 or the damper 206. The coupling feature 252 may include one or more of a retaining ring, a nut, or castellations (similar to the castellations shown in FIG. 2A). The coupling feature 252 may be located radially inward from the pedestal 204. For example, the coupling feature 252 may be used to couple the annular springs 212, 214 to the damper 206 and the bearing outer race 224.

A third coupling feature 254 may be coupled to one or both of the annular springs 212, 214 and one or both of the pedestal 204 or the damper 206, and may resist rotation of the annular springs 212, 214 relative to the pedestal 204 or the damper 206. The coupling feature 254 may further may resist axial separation of the annular springs 212, 214 from the pedestal 204 or the damper 206. The coupling feature 254 may include one or more of a nut or a retaining ring. The coupling feature 254 may be located radially outward from the damper 206. For example, the third coupling feature 254 may be used to couple the annular springs 212, 214 to the pedestal 204.

In order to assemble the assembly 200, the bearing support 222, the bearing outer race 224, the damper 206, and the first annular spring 212 may be coupled together. These components, after being coupled together, may be positioned in place in the gas turbine engine. Afterwards, these components may be locked in place using one or more of pins, castellations, or nuts. Next, the pedestal 204 may be inserted adjacent to the first annular spring 212, and the second annular spring 214 may be inserted adjacent to the pedestal 204. The second annular spring 214 may then be coupled to one or both of the damper 206 or the pedestal 204, and the coupling feature 254 may be fastened to couple the assembly 200 together.

In various embodiments, the first annular spring 212, the pedestal 204, and the second annular spring 214 may be coupled with a bore 230 of the bearing support 222 using an interference fit. In that regard, the bore 230 of the bearing support 222 may have a "stepped" design. That is, the bore 230 may have a first portion 232 aligned with the second annular spring 214, a second portion 234 aligned with the pedestal 204, and a third portion 236 aligned with the first annular spring 212. The second portion 234 may extend farther outward in the radial direction than the third portion 236, and the first portion 232 may extend farther outward than the second portion 234. In various embodiments, the difference in diameter of the portions of the bore 230 may be between 0.001 inches and 0.1 inches (0.0254 millimeters (mm) and 2.54 mm), between 0.003 inches and 0.07 inches (0.0762 mm and 1.78 mm), or between 0.004 inches and 0.05 inches (0.102 mm and 1.27 mm). In that regard, the first annular spring 212, the pedestal 204, and the second annular spring 214 may each have a diameter that facilitates an interference fit within the corresponding portion of the bore 230. The second annular spring 214 may be inserted first, then the pedestal 204, and finally the first annular spring 212. This stepped design may reduce undesirable contact of components during the installation and disassembly.

Figure 4:
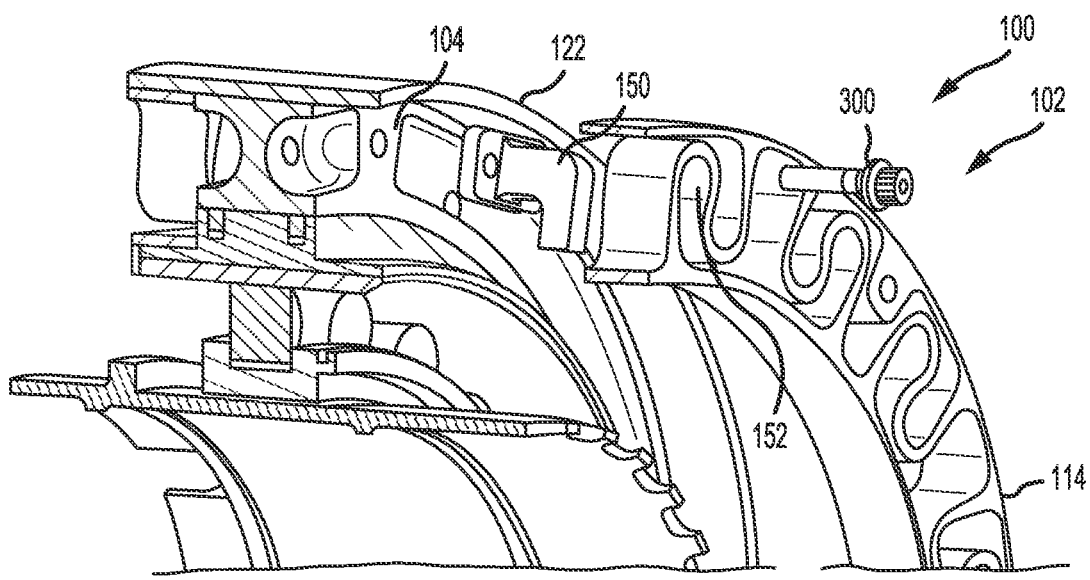
FIG. 4 illustrates inclusion of an oil nozzle in a centering and damping assembly, in accordance with various embodiments.
Figure 4:
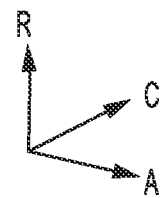

Referring now to FIG. 4, an oil nozzle 150 may be included in the assembly 100. In particular, the oil nozzle 150 may be coupled to the pedestal 104, such as by using the fastener 138 of FIG. 2C, or using a fastener 300, and may receive oil or another lubricant via a pathway defined by the pedestal 104. In various embodiments, the fastener 138 may extend through the second annular spring 114, the oil nozzle 150, and the pedestal 104, or through the oil nozzle 150 and the pedestal 104 without extending through the second annular spring 114. The oil nozzle 150 may provide lubricant to the bearing compartment 102. The second annular spring 114 may include or define one or more window 152. During assembly, the oil nozzle 150 may be positioned through the window 152 such that the oil nozzle 150 extends axially forward (or axially aft) of the second annular spring 114.

In various embodiments and as mentioned above, it may be desirable to resist rotation of the inner ring 118 relative to the outer ring 120 in order to reduce the likelihood of damage to the second annular spring 114 during a fan blade out (FBO) event. In that regard, the assembly 100 may include various features to resist this rotation.

Figure 5A:
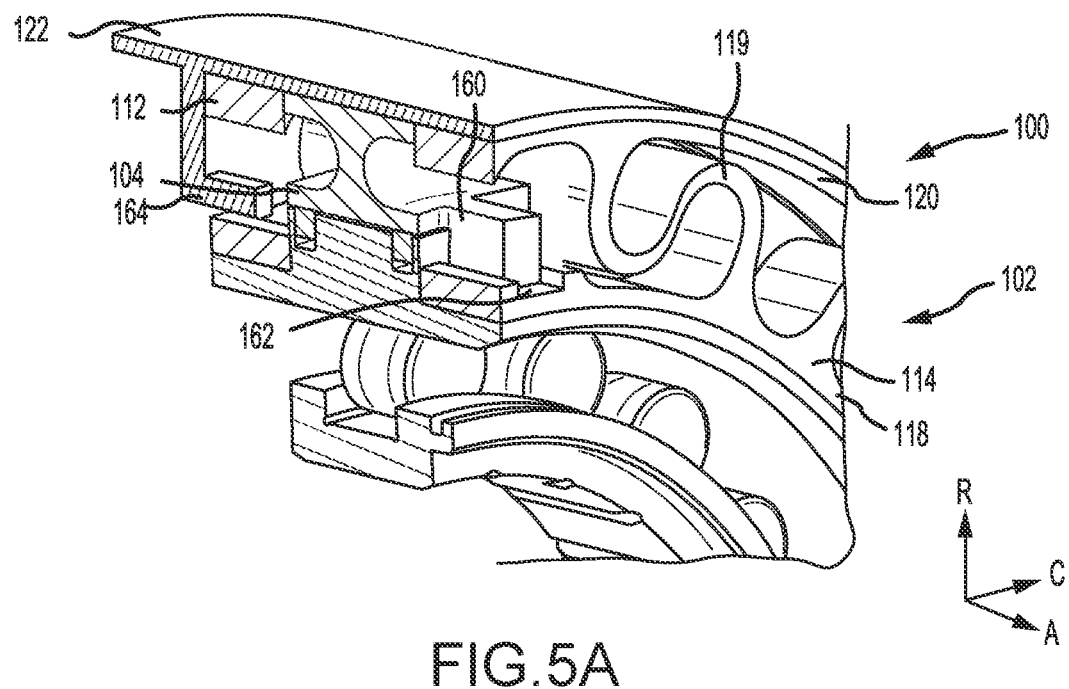
FIGS. 5A and 5B illustrate fan blade out features of a centering and damping assembly, in accordance with various embodiments.

For example and referring to FIG. 5A, the pedestal 104 may include or define a pedestal lug 160, and the inner ring 118 of the second annular spring 114 may include or define a slot 162. The pedestal lug 160 may be received by the slot 162 in order to resist rotation of the inner ring 118 relative to the pedestal 104, which likewise resists rotation of the inner ring 118 relative to the outer ring 120.

As another example, the bearing support 122 may include or define a support lug 164. The support lug 164 may be received by the slot 162, and the interface between the support lug 164 and the slot 162 may resist rotation of the inner ring 118 relative to the bearing support 122, which likewise reduces rotation of the inner ring 118 relative to the outer ring 120.

In various embodiments, only one of the pedestal lug 160 or the support lug 164 may be used in the assembly 100 as an anti-rotation feature.

Figure 5B:
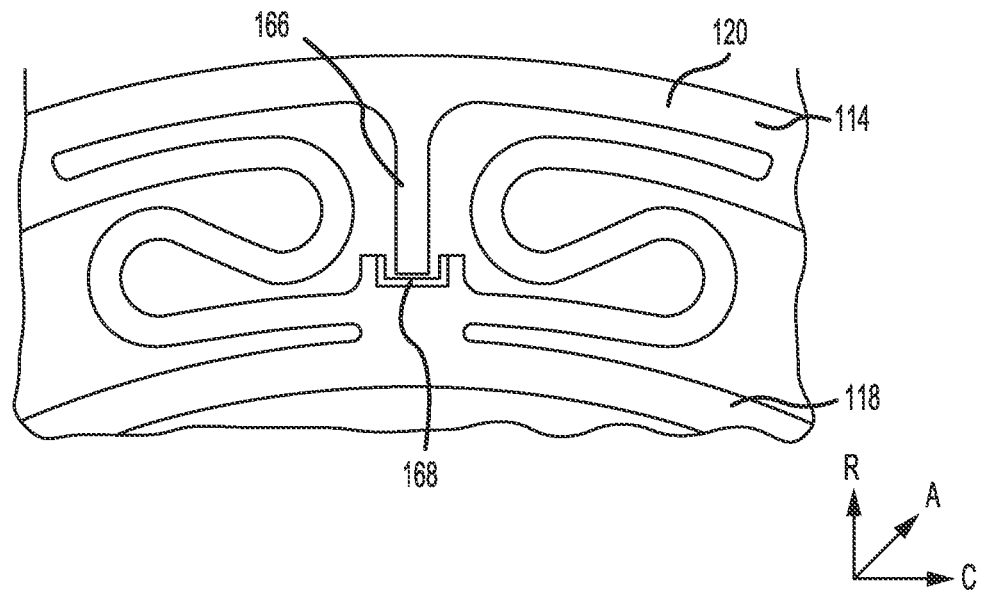

As yet another example and referring to FIG. 5B, the second annular spring 114 may include an outer ring lug 166 extending from the outer ring 120 towards the inner ring 118. Similarly, the inner ring 118 may define, include, or be coupled to a slot 168. The outer ring lug 166 may be received by the slot 168 such that the interface between the outer ring lug 166 and the slot 168 resists rotation of the inner ring 118 relative to the outer ring 120.

Although the features illustrated in FIGS. 4, 5A, and 5B are shown included in the assembly 100 of FIG. 2A, they may likewise be included in the assembly 200 of FIG. 3.

Figure 6A:
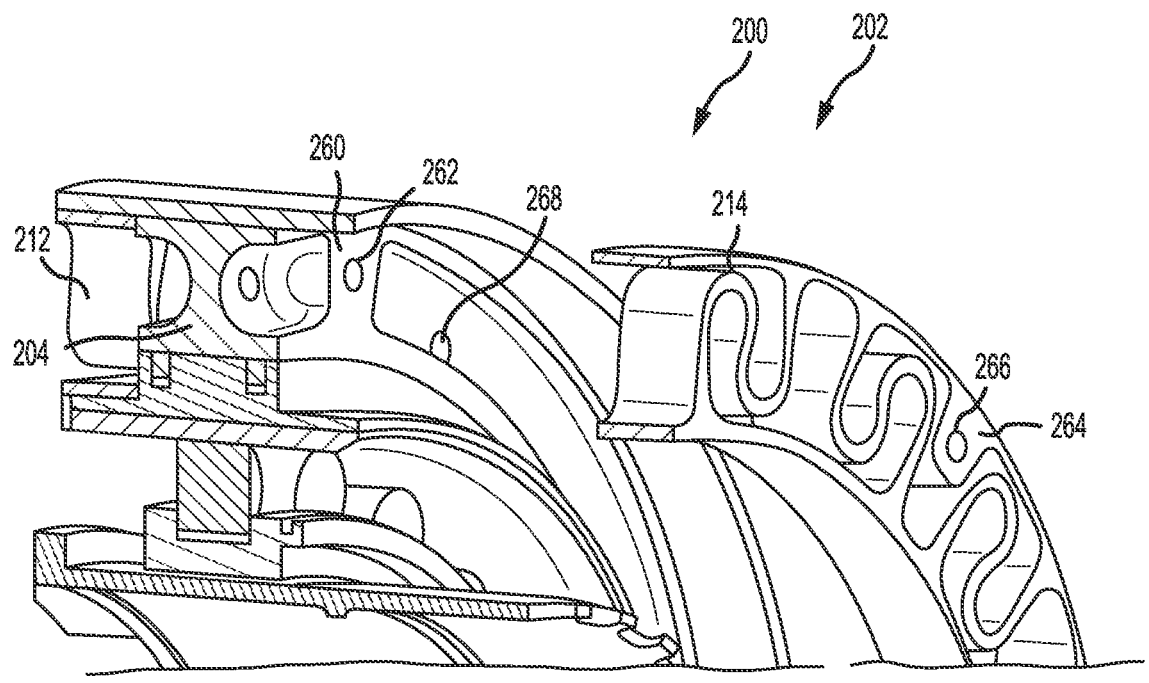
FIGS. 6A and 6B illustrate disassembly features of a centering and damping assembly, in accordance with various embodiments.
Figure 6B:
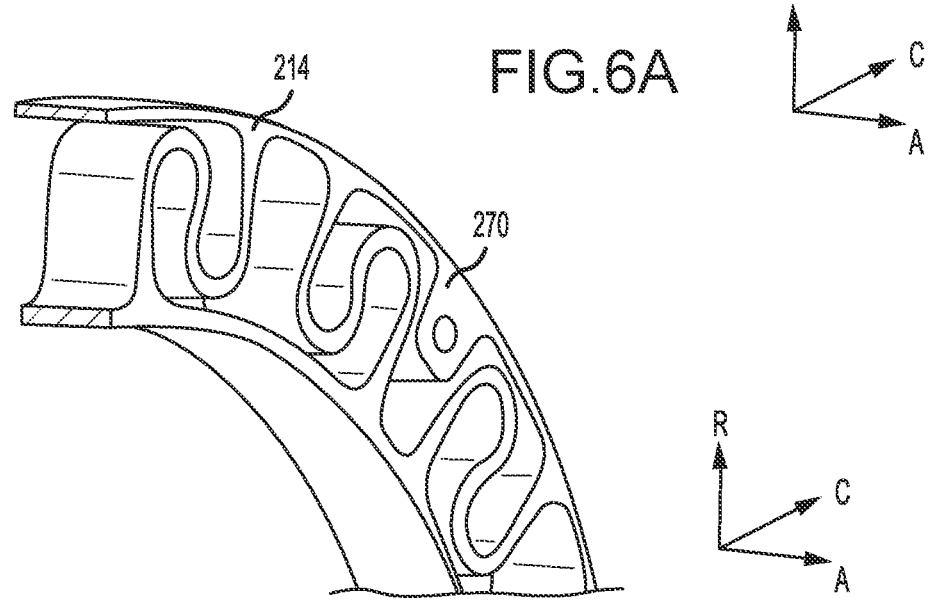

The assembly 100 of FIG. 2A (or the assembly 200 of FIG. 3) may include various features to facilitate disassembly. For example and referring to FIGS. 6A and 6B, the pedestal 204 of the assembly 200 may include or define a pedestal boss 260 which defines a threaded hole 262. Likewise, the second annular spring 214 may define or include a spring boss 264 which defines a threaded hole 266. Additionally, the pedestal 204 may define or include a hole with a helicoil 268. A disassembly tool having a threaded tip may be received by any one or more of the threaded hole 262, the threaded hole 266, or the helicoil 268 and may be actuated away from the first annular spring 212 in order to remove the respective components from the assembly 200.

As another example, one or more of the second annular spring 214 or the pedestal 204 may define or include a disassembly boss 270. A puller tool, such as pliers, may engage the disassembly boss 270 and may be actuated in order to remove the respective components.

Benefits, other advantages, and solutions to problems have been described herein with regard to specific embodiments. Furthermore, the connecting lines shown in the various figures contained herein are intended to represent exemplary functional relationships and/or physical couplings between the various elements. It should be noted that many alternative or additional functional relationships or physical connections may be present in a practical system. However, the benefits, advantages, solutions to problems, and any elements that may cause any benefit, advantage, or solution to occur or become more pronounced are not to be construed as critical, required, or essential features or elements of the inventions. The scope of the invention is accordingly to be limited by nothing other than the appended claims, in which reference to an element in the singular is not intended to mean "one and only one" unless explicitly so stated, but rather "one or more." Moreover, where a phrase similar to "at least one of A, B, or C" is used in the claims, it is intended that the phrase be interpreted to mean that A alone may be present in an embodiment, B alone may be present in an embodiment, C alone may be present in an embodiment, or that any combination of the elements A, B and C may be present in a single embodiment; for example, A and B, A and C, B and C, or A and B and C. Different cross-hatching is used throughout the figures to denote different parts but not necessarily to denote the same or different materials.

Systems, methods and apparatus are provided herein. In the detailed description herein, references to "one embodiment", "an embodiment", "various embodiments", etc., indicate that the embodiment described may include a particular feature, structure, or characteristic, but every embodiment may not necessarily include the particular feature, structure, or characteristic. Moreover, such phrases are not necessarily referring to the same embodiment. Further, when a particular feature, structure, or characteristic is described in connection with an embodiment, it is submitted that it is within the knowledge of one skilled in the art to affect such feature, structure, or characteristic in connection with other embodiments whether or not explicitly described. After reading the description, it will be apparent to one skilled in the relevant art(s) how to implement the disclosure in alternative embodiments.

Furthermore, no element, component, or method step in the present disclosure is intended to be dedicated to the public regardless of whether the element, component, or method step is explicitly recited in the claims. No claim element herein is to be construed under the provisions of 35 U.S.C. 112(f), unless the element is expressly recited using the phrase "means for." As used herein, the terms "comprises", "comprising", or any other variation thereof, are intended to cover a non-exclusive inclusion, such that a process, method, article, or apparatus that comprises a list of elements does not include only those elements but may include other elements not expressly listed or inherent to such process, method, article, or apparatus.

What is claimed is:

1. An assembly for use in a bearing compartment having an axis, the assembly comprising:
    a bearing outer race configured to be located in the bearing compartment; and
    at least one annular spring positioned in the bearing outer race and extending entirely circumferentially within the bearing outer race, the at least one annular spring being asymmetric in the axial direction and asymmetric in the circumferential direction relative to the axis to reduce the likelihood of amplification of vibration experienced by the at least one annular spring.

2. The assembly of claim 1, wherein the at least one annular spring is configured for use as a centering spring.

3. The assembly of claim 1, wherein the at least one annular spring is formed to have the asymmetry by using a first material a first portion of the at least one annular spring and a second material that is different than the first material in a second portion of the at least one annular spring.

4. The assembly of claim 1, wherein the at least one annular spring is formed to have the asymmetry by adjusting a thickness in at least a portion of the at least one annular spring.

5. The assembly of claim 1, wherein the at least one annular spring is formed to have the asymmetry by adjusting a quantity of turns per unit area in at least a portion of the at least one annular spring.

6. The assembly of claim 1, wherein the at least one annular spring is formed to have the asymmetry by adjusting a length of at least a portion of the at least one annular spring.

7. The assembly of claim 1, wherein the at least one annular spring is formed to have the asymmetry by adjusting a shape of at least a portion of the at least one annular spring.

8. The assembly of claim 1, wherein the at least one annular spring includes a first annular spring and a second annular spring, and the at least one annular spring is formed to have the asymmetry by adjusting an angular offset of the first annular spring relative to the second annular spring.

9. The assembly of claim 1, wherein the at least one annular spring includes a first annular spring and a second annular spring, and the at least one annular spring is formed to have the asymmetry by at least one of adjusting a material of the first annular spring relative to the second annular spring, adjusting a thickness of the of the first annular spring relative to the second annular spring, adjusting a quantity of turns per unit area of the first annular spring relative to the second annular spring, adjusting a length of the first annular spring relative to the second annular spring, or adjusting a shape of the first annular spring relative to the second annular spring.

10. An assembly for use in a bearing compartment having an axis, the assembly comprising: a pedestal; a damper having a damper surface configured to be positioned adjacent to the pedestal and separated from the pedestal by a gap, the gap receiving a damping fluid to form a damping assembly between the damper and the pedestal; and an annular spring positioned axially forward or axially aft of the pedestal and being at least one of radially offset relative to a second annular spring or asymmetric in the axial direction and asymmetric in the circumferential direction relative to the axis to reduce the likelihood of amplification of vibration experienced by the annular spring, the annular spring extending entirely circumferentially around the damper.

11. The assembly of claim 10, wherein the annular spring is formed to have the asymmetry by adjusting a thickness in at least a portion of the annular spring.

12. The assembly of claim 10, wherein the annular spring is formed to have the asymmetry by adjusting a quantity of turns per unit area in at least a portion of the annular spring.

13. The assembly of claim 10, wherein the annular spring is formed to have the asymmetry by adjusting a length of at least a portion of the annular spring.

14. The assembly of claim 10, wherein the annular spring is formed to have the asymmetry by adjusting a shape of at least a portion of the annular spring.

15. An assembly for use in a bearing compartment having an axis, the assembly comprising:
- a bearing outer race configured to be located in the bearing compartment; and
- at least one annular spring positioned in the bearing outer race and extending entirely circumferentially within the bearing outer race, the at least one annular spring being asymmetric in the axial direction and asymmetric in the circumferential direction relative to the axis to reduce the likelihood of amplification of vibration experienced by the at least one annular spring,
- wherein the at least one annular spring is formed to have the asymmetry by at least one of:
- adjusting a material in at least a portion of the at least one annular spring;
- adjusting a thickness in at least a portion of the at least one annular spring;
- adjusting a quantity of turns per unit area in at least a portion of the at least one annular spring;
- adjusting a length of at least a portion of the at least one annular spring; or
- adjusting a shape of at least a portion of the at least one annular spring.

16. The assembly of claim 15, wherein the at least one annular spring is configured for use as a centering spring.

17. The assembly of claim 15, wherein the at least one annular spring includes a first annular spring and a second annular spring, and the at least one annular spring is formed to have the asymmetry by forming the first annular spring to be asymmetric relative to the second annular spring.

\* \* \* \* \*